Patented Oct. 12, 1948

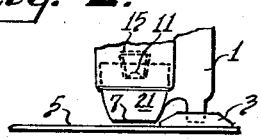
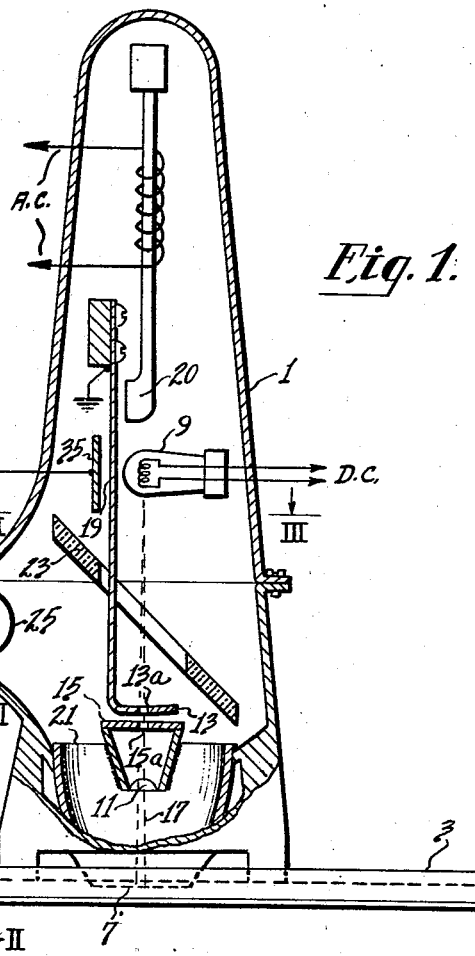
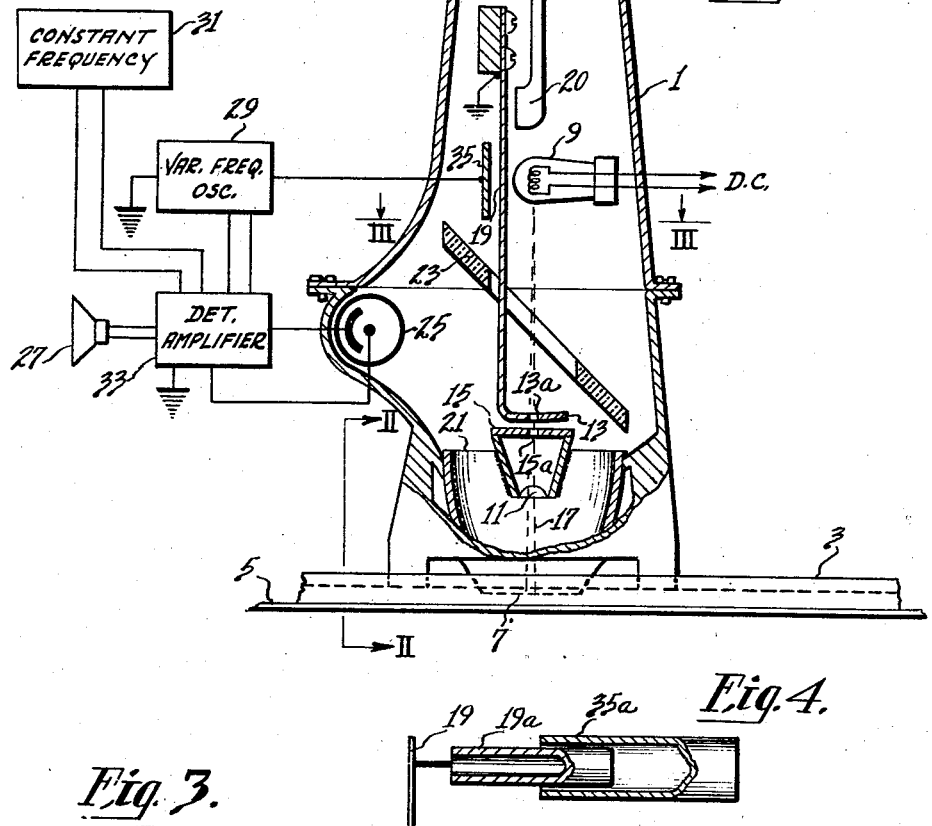
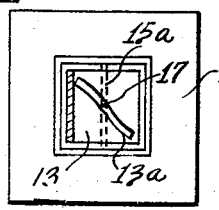
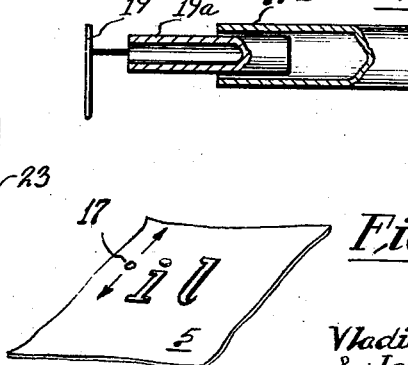

2,451,014

UNITED STATES PATENT OFFICE 2,451,014

OPTOPHONE

Vladimir K. Zworykin, Princeton, and James Hillier, Cranbury, N. J., assignors to Radio Corporation of America, a corporation of Delaware Application October 26, 1944, Serial No. 560,472

6 Claims. (Cl. 250—41.5)

1

This invention relates to the art of converting light energy into sound energy, and has for its principal object to provide an improved method of and apparatus for enabling a blind person to locate and distinguish between different degrees of light through the ear and thus to read printed matter.

The prior art on such "reading machines" or "optophones" (as these instruments are sometimes called) is well exemplified by U. S. Patents 1,320,366; 1,350,954; 1,352,940; 1,390,883; and 1,542,937, wherein the patentees, or some of them, recognize the desirability of achieving an instrument having a high optical resolving power. To this end, it has previously been proposed to provide a device incorporating an optical system having as many as five discrete sources of light for exploring each letter or other elementary area of the objective. Irrespective of the advantages claimed for such devices it may be said, generally, that they are cumbersome, expensive and are far more difficult to align (with respect to the area to be examined) than is necessary or desirable.

Accordingly, another object of the present invention is to provide an electro-optical instrument which shall possess a very high resolving power, and one nevertheless characterized by the simplicity and economy of its parts and by its trouble-free performance.

Another and important object of the invention is to provide an improved "black sounding" optophone; the "black sounding" being achieved with a single spot of light and without the use of additional lenses or auxiliary "balancing networks" for silencing the instrument when the spot of light encounters a white space.

Still another object of the invention is to provide a new and improved method of translating a visual objective or record such, for example, as ordinary printed matter, into audible signals characteristic of the individual letters or other elementary areas of which said printed matter or other objective is comprised.

The foregoing and other objects are achieved in accordance with the method of the invention preferably by varying the frequency of an audible tone between a pair of limiting frequencies and synchronously moving a single spot of light up and down in a vertical direction, that is, perpendicular to the line of printed matter, at said certain rate over the objective while advancing the spot relatively slowly along the line in a horizontal direction, then picking up the light which is reflected from the elementary areas of the objective upon which the spot impinges and employing the picked-up light for interrupting said audible tone when said spot of light encounters a "white space" on the objective. The frequency of the audible tone at any instant will uniquely represent the position of the spot of light at that instant, and thus the location and extent of the character in the area covered by the spot can be determined.

Other objects and advantages will be apparent and the invention itself will be best understood by reference to the following specification and to the accompanying drawing, wherein:

Fig. 1 is a partly diagrammatic sectional elevation of an optophone embodying the invention.

Fig. 2 is a fragmentary side elevational view taken on the line II—II of Fig. 1.

Fig. 3 is a sectional view taken on the line III—III of Fig. 1.

Fig. 4 is a side elevation partly in section of a tubular capacitor which may form part of the frequency changing circuit shown in Fig. 1 and Fig. 5 is a fragmentary view in perspective of some printed matter which will be referred to in explaining the principle and describing the operating of the instrument of Fig. 1.

As shown in Fig. 1, when the invention is incorporated in a "reading machine" the several parts, or as many as need be, are contained in a light-weight casing 1 which is preferably mounted for slideable movement in a grooved ruler or track 3, so that, when the ruler and casing are placed in position below a line of print on a page 5, the casing may be moved in a straight line on said track in the direction in which the print is to be read. That portion of the base of the casing 1 which extends beyond the edge of the track or ruler 3 is provided with an aperture 7 through which light from a preferably direct current source 9 is directed as by an optical lens 11 upon the printed character (or other elementary area of the objective) which lies in register with the said aperture. Before light from the bulb 9 impinges upon the lens 11 and the objective 5 it passes through a moveable and an immoveable slotted mask 13 and 15, respectively, which serve, in a manner later described, to limit the cross sectional area of the beam so that the light reaching the objective 5 is in the form of a mere spot 17 of a diameter considerably smaller than the characters on the page 5. If desired the stationary masking plate 15 may be omitted, in which case the aperture 13a in the movable mask 13 instead of being in the form of an elongated slit may comprise a mere punctiform opening. It is usually preferable, however, to employ two masks each having an elongated slit therein, the slit 15a (see Fig. 3) in the stationary mask 15 extending in the vertical direction (i. e. towards the top of the objective), and the slit 13a in the movable mask 13 extending across the slit 15a at an angle other than a right angle. The movable slit 13a may be curved to compensate for irregular motion or to provide any desired scanning motion. One advantage of this particular arrangement of the slits 13a and 15a resides in the fact that the distance the mask 13 need be moved to move the beam 17 through a single vertical "scanning" movement is much less than it would be if the stationary mask 15 were omitted and the beam forming aperture comprised a punctiform opening in the movable mask 13.

In order to impart the requisite "vertical" scanning movement to the light beam 17, the plate 13 which contains the beam-forming aperture 13a is mounted upon a flexible metal arm 19 and the said arm is swung rapidly to the left and to the right (as viewed in Fig. 1) at a constant frequency of from say 20 to 200 cycles per second as by means of an armature 20. This horizontal to-and-fro movement of the slotted mask 13 moves the point at which the slits 13a and 15a converge in the opposite or vertical direction so that the light 17 which passes through both masks at the said point moves rapidly in a substantially straight line up and down (i. e., "in a vertical direction", with respect to the printed characters, see Fig. 5) on the paper or other objective 5 which is in register with the aperture 7 in the base of the casing 1.

The light reflected from the elementary areas of the objective 5 which are sequentially presented to the aperture 7 when the casing 1 is moved along on its track 3 is picked up within the casing by a cup-shape reflector 21 which directs the picked-up rays upwardly to an inclined mirror 23 from whence they are reflected upon a photoelectric device 25 which serves, in a manner later described, to control the output of a loudspeaker or other reproducer 27.

The same movement of the arm 19 which produces the previously described scanning movement also serves to vary the frequency of the variable frequency stage 29 of a beat frequency oscillator 29-31 so that the output of a detector or a detector- amplifier 33, into which said oscillators feed, varies between two limiting frequencies, say between 250 and 800 cycles per second. This variation in frequency may be achieved by mounting a capacitor armature 35 of suitable design in capacitative relation with respect to the arm 19 and utilizing the variation in capacitance resulting from the above described movement of the said arm to vary the tuning of the tank circuit (not shown) of the variable frequency oscillator 29.

It will be appreciated by those skilled in the art to which this invention appertains that any desired linear or non-linear change in capacitance (and hence in frequency) may be achieved by a proper design of the capacitor armatures. To this end, referring to Fig. 4, a pair of cylindrical armatures 35a—19a may be substituted for (or provided in addition to) the flat-plate capacitor 35—19 of Fig. 1 for varying the output of the reproducer 27.

As previously set forth, the light which is picked up from the objective 5 is directed upon the photo-tube 25 and the resulting photoelectric current (or voltage) is employed to control the output of the reproducer 27. To this end the E. M. F. developed by the photo-tube 25 is preferably applied to the grid (not shown) of the amplifier 33 in such a manner that when the spot of light 17 encounters a white space on the objective the reproducer 27 is silenced. Thus, in scanning the (lower-case) letter "i" (see Fig. 5) the variable pitch note in the loudspeaker will be silenced during the interval when the spot of light is between the body of the "i" and the dot thereabove, and is thus distinguished aurally from the lower-case letter "l." A similar though relatively longer interruption of the output of the reproducer 27 occurs when the spot 17 scans the "white space" between the letters or other characters. It will be appreciated by those skilled in the art that the silent periods which are characteristic of the "white spaces" and the audible periods characteristic of the "black spaces" form a code which is much easier to learn and less trying to the ear than a code wherein the silent and audible periods are reversed.

It will now be apparent that the present invention provides a new and improved method of, and instrument for, enabling a blind person to locate and distinguish between different degrees of light through the ear and thus to read printed matter and the like.

What is claimed is:

1. A method of enabling a blind person to locate and distinguish between different degrees of light through the ear and thus to read printed matter, said method comprising, producing an audible tone, synchronously varying the frequency of said tone and moving a spot of light in a vertical direction over an elementary area of said printed matter while advancing said spot horizontally from one elementary area to the next, and interrupting said audible tone when said spot of light encounters a light reflecting area during its said vertical and horizontal movements.

2. A method of translating printed matter into audible signals characteristic of the individual characters of which said printed matter is comprised, said method comprising varying the frequency of an audible tone between a pair of limiting frequencies continuously and at a certain rate, moving a spot of light in a vertical direction synchronously with the variation of said tone and at said certain rate over each of said characters sequentially and interrupting said audible tone when said spot of light encounters "white space" in said printed matter.

3. A method of enabling a blind person to locate and distinguish between different degrees of light through the ear and thus to read printed matter, said method comprising, varying an audible tone between a pair of limiting frequencies at a lower frequency, causing a spot of light to move across a line of print in a vertical direction at said lower frequency synchronously with the variation of said audible tone while moving said spot along a line of said printed matter, whereby said light is reflected as determined by the light absorbing properties of the area of the printed matter upon which said spot impinges, collecting at least some of the reflected light and interrupting said audible tone when said collected light exceeds a predetermined intensity.

4. A reading machine comprising means for producing an audible tone, means for directing a spot of light upon the matter to be read, said spot of light being substantially smaller than the individual characters of which said reading matter is comprised, means for synchronously varying the frequency of said tone and for moving said spot of light continuously and at a certain rate in a vertical direction over said individual characters and means for interrupting said audible tone when said spot of light encounters a white space during its said vertical excursions.

5. A reading machine comprising a spot source of light adapted to be moved over the matter to be read, means for moving said spot of light continuously and at a certain rate in a vertical direction over the individual characters of which said reading matter is comprised, means for generating an audible tone, means for varying the frequency of said audible tone between a pair of limiting frequencies in synchronism with the movement of said spot and at said certain rate, and means for interrupting said varying audible tone when said spot of light encounters a white space on or about said individual characters.

6. A reading machine comprising, a spot source of light adapted to be moved along a line of the matter to be read, means for causing a spot of light from said source to move up and down across the individual characters of said reading matter transversely to the line at a certain rate, means for generating an audible tone, means for varying the frequency of said audible tone between a pair of limiting frequencies synchronously with the movement of said spot and at said certain rate, means for collecting at least some of the light reflected from said reading matter, and means responsive to collected light of a certain intensity for interrupting said varying audible tone.

VLADIMIR K. ZWORYKIN.
JAMES HILLIER.

REFERENCES CITED

The following references are of record in the file of this patent:

UNITED STATES PATENTS

| Number | Name | Date |
|---|---|---|
| 1,320,366 | Houskeeper | Oct. 28, 1919 |
| 1,350,954 | Barr et al. | Aug. 24, 1920 |
| 1,352,940 | Brown | Sept. 14, 1920 |
| 1,542,937 | Hammond, Jr. | June 23, 1925 |
| 1,798,118 | Clifton | Mar. 24, 1931 |